United States Patent [19]
Watanabe et al.

[11] Patent Number: 4,810,676
[45] Date of Patent: Mar. 7, 1989

[54] CHROMIUM OXIDE-BASE CERAMIC MATERIAL

[75] Inventors: Tadahiko Watanabe; Kazuhisa Shobu, both of Tosu; Yuji Enomoto, Ibaraki, all of Japan

[73] Assignee: Agency of Industrial Science and Technology, Tokyo, Japan

[21] Appl. No.: 207,890

[22] Filed: Jun. 16, 1988

Related U.S. Application Data

[63] Continuation of Ser. No. 839,289, Mar. 13, 1986, abandoned.

[30] Foreign Application Priority Data

Mar. 19, 1985 [JP] Japan ................... 60-57040

[51] Int. Cl.$^4$ .................. C04B 35/12; C04B 35/56
[52] U.S. Cl. .................................... 501/87
[58] Field of Search ............................ 501/87

[56] References Cited

U.S. PATENT DOCUMENTS 4,010,233  3/1977  Winter et al. .................. 501/87
4,110,260  8/1978  Yamamoto et al. ............. 501/87

FOREIGN PATENT DOCUMENTS 58-192301  11/1983  Japan .

*Primary Examiner*—Mark L. Bell
*Attorney, Agent, or Firm*—Oblon, Fisher, Spivak, McClelland & Maier

[57] ABSTRACT

Described herein is a chromium oxide-based ceramic material obtained by sintering a powder mixture consisting of chromium oxide powder and 0.1–90 wt % of chromium carbide powder based on the total amount of the powder mixture. The sintered product has not only a small coefficient of friction over a wide temperature range from normal to high temperature but also excellent deflection resistance and high density with less pores, which are suitable for application as a sliding material.

8 Claims, 1 Drawing Sheet

CHROMIUM OXIDE-BASE CERAMIC MATERIAL

This application is a continuation of application Ser. No. 06/839,289, filed on Mar. 13, 1986, now abandoned.

BACKGROUND OF THE INVENTION

1. Field of the Invention

This invention relates to a nove high-density chromium oxide-base ceramic material, and more particularly to a chromium oxide-base ceramic material suitable for use as a sliding material or abrasion resistant mechanical parts in a wide temperature range from normal to high temperatures.

2. Description of the Prior Art $Cr_2O_3$ has been known as a raw material for good sliding materials with a small coefficient of friction over a wide temperature range from normal to high temperatures, including $Cr_2O_3$-Cr cermets and the like. It is also known in the art that $Cr_3C_2$-Ni cermets have similar properties.

However, the above-mentioned cermets with a metal content become unusable at temperatures of about 1000° C. due to softening of the metal component in a considerable degree. Consequently, there has been a strong demand for development of a material which can be used in a broad temperature range covering from normal temperature to temperatures higher than 1000° C.

The ceramic material which is applicable as a sliding material or as a abrasion resistant mechanical part in a wide temperature range from normal to high temperature is required to have the following properties: a small coefficient of friction in that temperature range; less abrasive wear; and high deflection resistance.

Especially, since he service life of a sliding material is shortened by seizure on a contacting material, it's coefficient of friction should be as small as possible. On the other hand, there occurs a phenomenon of abrasive wear entailing a sort of fine cracks generally referred to as "chipping." In case of a ceramic material, it is important to prevent such chipping since it greatly restricts the range of applications of the material. To prevent chipping, it is necessary to secure greater deflection resistance. Greater the deflection resistance, greater becomes the toughness of the material.

Further, above-mentioned chipping is brought about by tensile force, and the resistance to such tensile force is greatly influenced by the pores which are contained in the ceramic material. Accordingly, in order to prevent chipping, the ceramic material should be free of pores, namely, should have a high density.

SUMMARY OF THE INVENTION

It is a primary object of the present invention to provide a ceramic material which can serve as a sliding material or as a abrasion resistant mechanical part satisfactorily in a broad temperature range from normal temperature to high temperatures of about 1000° C.

It is another object of the present invention to provide a ceramic material suitable for use as a sliding material, which exhibits a small coefficient of friction along with high deflection resistance in the above-mentioned temperature range, and which has a high density with less pores.

In search for a material which would conform with the above-mentioned objects, the present inventors have conducted an extensive study on chromium oxide-base composite ceramics, and as a result found that a chromium oxide-chromium carbide-base ceramic material can easily produce a sinter of high density and with excellent deflection resistance.

More specifically, according to the present invention, there is provided a chromium oxide-base ceramic material which is produced by sintering a powder mixture consisting of chromium oxide powder added with 0.1-90 wt% of chromium carbide powder on the basis of the total weight.

The above and other objects, features and advantages of the invention will become apparent from the following description and the appended claims, taken in conjunction with the accompanying drawings.

PARTICULAR DESCRIPTION OF THE INVENTION

Examples of the chromium oxide which is employed as a major component of the ceramic material according to the invention include $Cr_5O_2$, $Cr_2O_3$, $Cr_3O_4$, $CrO_2$, $CrO$, $Cr_3O_2$ Examples of the chromium carbide include $Cr_3C_2$, $Cr_7C_3$, $Cr_{23}C_6$ and $Cr_2C$. Both of the chromium oxide and chromium carbide may consist of powder of one or a mixture of these compounds.

The raw material powder is preferred to be smaller than 2 $\mu m$ in average particle diameter since finer powder can be sintered more easily.

According to the present invention, the additive amount of the chromium carbide powder is selected from a range of 0.1-90 wt% on the basis of the total weight of the mixture powder. It becomes difficult to obtain a ceramic material of desired physical propeties if the additive amount is less than 1.0 wt% or greater than 90 wt%. In a case where the chromium oxide occupies the major proportion of the mixture powder, the final product is improved in oxidation resistance, conspicuously exhibiting properties which endure use at high temperatures. On the contrary, in case the chromium carbide occupies the major proportion, the final product is markedly improved in properties which will contribute to remove the cause of seizures, especially seizures on steel.

Figure 1:
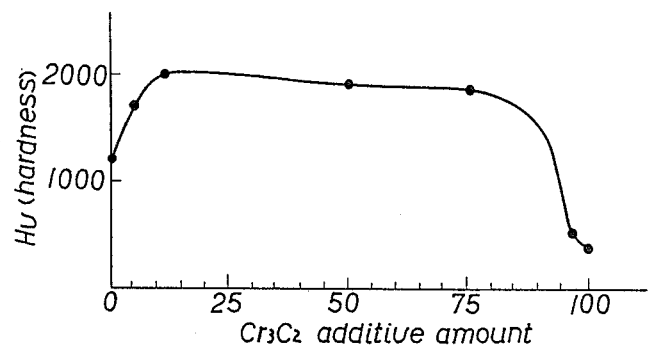
FIGS. 1 and 2 are diagrams showing the hardness of and toughness of the sinter in relation with the additive amount of $Cr_3C_2$ to $Cr_2O_3$, respectively.
Figure 2:
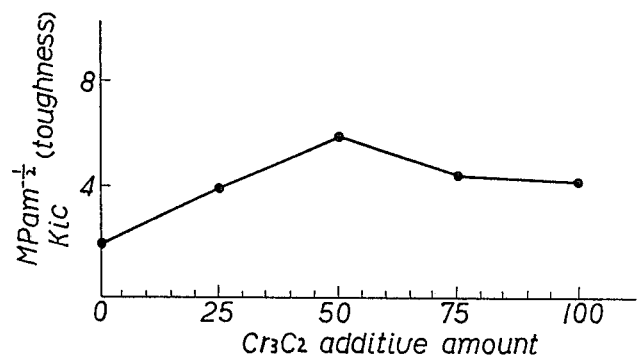

FIGS. 1 and 2 show the hardness and toughness of the sinter in relation with the additive amount of $Cr_3C_2$ to $Cr_2O_3$. It is important for a sliding material to be satisfactory in both hardness and toughness.

The ceramic material of the present invention is preferred to be used as a sliding material in the following manner.

(1) In a case where parts of the same material are to be contacted with each other, it is desirable to use $Cr_2O_3$ - (0.1-50 wt%) $Cr_3C_2$. Since it exhibits a slightly larger coefficient of friction from room temperature to 300° C., an SP-base ultra-high pressure additive is used up to 300° C., omitting the additive for application at a temperature above 300° C. Where a high load is expected, $Cr_3C_2$ is blended in an amount of 40-70 wt%, preferably in an amount of about 50 wt% to enhance the toughness of the material.

(2) In a case where the ceramic material of the invention is to be contacted with a steel material, it is desired to use $Cr_2O_3$- (50-90 wt%)$Cr_3C_2$, blending $Cr_3C_2$ in an amount of 40–70%, preferably in an amount of about 50 wt% under high load.

The ceramic material of the present invention can be produced by known methods. For example, the mixture powder of the raw material is filled in a graphite die and sintered for 10–300 minutes in a non-oxidative atmosphere such as vacuum, argon, hydrogen or the like with a die pressure of 50–300 kg/cm$^2$ at a temperature of 1200°–1400° C.

Alternatively, the mixture powder of the raw material which is filled in a die is cold-pressed by a press under a pressure of about 0.5–10 ton/cm$^2$, and then pressed to shape by a rubber press with a hydrostatic pressure of about 0.5–10 ton/cm$^2$ Of course, the raw material powder may be compacted by either one of these pressing operations, or shaped by the slurry method. Nextly, the resulting green compact is sintered for 30–300 minutes in a atmosphere such as vacuum, argon, hydrogen or the like at a temperature of 1400°–1600° C.

In this manner, a ceramic material which is suitable as a sliding material can be obtained. The ceramic material thus obtained has a small coefficient of friction in a broad temperature range from normal to high temperatures of about 1000° C., so that it is suitable for a sliding material which is intended for use at high temperatures.

More particularly, when ceramic parts coated with $Cr_2O_3$ are contacted with each other, the coefficient of friction begins to drop at a temperature of about 200° C., reaching 0.2–0.4 at a temperature level of about 300° C. to 400° C. This value implies that the contacting parts are in a satisfactory frictional condition. Even in a temperature range of from room temperature to 300° C., the coefficient of friction can be lowered to 0.1–0.4 by the use of a lubricant oil wth an SP-base ultra-high pressure additive, attaining an excellent frictional condition. Substantially the same results can be expected from the $Cr_2O_3$–$Cr_2C_3$ base ceramic material of the invention, which contains $Cr_2O_3$ irrespective of its condition of oxidation. In addition, since it does not contain a metal as in the afore-mentioned $Cr_2O_3$–Cr base cermet, it permits applications in a broad temperature range from room temperature up to about 1000° C.

To serve as a sliding material or an abrasion resistant mechanical part, it is preconditioned for the ceramic material of the invention to have a small coefficient of friction in such a wide temperature range. As clear from the following examples, there can be obtained a ceramic material which is excellent especially in deflection resistance and which possesses high density almost free of pores, exhibiting a high deflection resistance of 30–50 kg/mm$^2$.

EXAMPLES

The features of the ceramic material according to the invention will be illustrated more particularly by the following examples.

EXAMPLE 1

95 wt% of $Cr_2O_3$ and 5 wt% of $Cr_3C_2$ were fully mixed and filled in a graphite die, which was retained at 1300° C. for 30 minutes in vacuum while applying thereto a die pressure of 200 kg/cm$^2$. The resulting sinter had deflection resistance of 50 kg/mm$^2$, and its structure contained no pores.

Specimens Nos. 1 to 11 of Table 1 were produced by a similar method under the conditions respectively indicated on the table. The above-described Example is shown as Specimen No. 3. For the purpose of comparison, there are also shown at No. 1 the results of a specimen which was not added with $Cr_3C_2$ powder at all.

EXAMPLE 2

25 wt% of $Cr_3C_2$ was added to and fully mixed with the balance of $Cr_2O_3$ powder, and, after filling in a die, the mixture powder was cold-compressed by a die pressure of 0.5 kg/cm$^2$, followed by compacting by a rubber press under 3 ton/cm$^2$. The resulting compact was sintered by retaining same at 1500° C. for 90 minutes in an argon atmosphere. The sinter thus obtained has deflection resistance of 50 kg/mm$^2$, and observation of its structure by a scanning electromicroscope revealed no pores.

TABLE 1

| Specimen No. | Composition | Sintering condition | Deflection resistance (kg/mm$^2$) | Pores |
| --- | --- | --- | --- | --- |
| 1 | $Cr_2O_3$ | 1300° C. × 30 min. | 20 | Yes |
| 2 | $Cr_2O_3$—5% $Cr_3C_2$ | 1200° C. × 30 min. | 35 | Yes |
| 3 | $Cr_2O_3$—5% $Cr_3C_2$ | 1300° C. × 30 min. | 50 | Nil |
| 4 | $Cr_2O_3$—5% $Cr_3C_2$ | 1400° C. × 30 min. | 40 | Yes |
| 5 | $Cr_2O_3$—0.1% $Cr_3C_2$ | 1300° C. × 30 min. | 40 | Yes |
| 6 | $Cr_2O_3$—1% $Cr_3C_2$ | 1300° C. × 30 min. | 50 | Nil |
| 7 | $Cr_2O_3$—10% $Cr_3C_2$ | 1300° C. × 30 min. | 50 | Nil |
| 8 | $Cr_2O_3$—25% $Cr_3C_2$ | 1300° C. × 30 min. | 50 | Nil |
| 9 | $Cr_2O_3$—50% $Cr_3C_2$ | 1300° C. × 30 min. | 50 | Nil |
| 10 | $Cr_2O_3$—75% $Cr_3C_2$ | 1300° C. × 30 min. | 30 | Nil |
| 11 | $Cr_2O_3$—90% $Cr_3C_2$ | 1300° C. × 30 min. | 30 | Nil |

We claim:

1. A substantially non-pourous, high-density chromium oxide-based ceramic material or mechanical part having abrasion resistance from ambient temperature to up to about 1000° C. produced by a process which comprises:
   (a) preparing a powder mixture consisting essentially of chromium oxide powder and about 0.1–90 wt.% of chromium carbide powder based on the total weight of the powder mixture,
   (b) pressure molding the powder mixture, and
   (c) sintering the molded powder mixture.

2. The chromium oxide-base ceramic body of claim 1, produced by sintering a powder mixture consisting essentially of chromium oxide powder and about 0.1–50 wt.% of chromium carbide powder based on the total weight of the powder mixture.

3. The chromium oxide-base ceramic body of claim 1, produced by sintering a powder mixture consisting essentially of chromium oxide powder and about 50–90 wt.% of chromium carbide powder based on the total weight of the powder mixture.

4. The chromium oxide-base ceramic body of claim 5, produced by sintering a powder mixture consisting essentially of chromium oxide powder and about 40–70 wt.% of chromium carbide powder based on the total weight of the powder mixture.

5. The chromium oxide-base ceramic body of claim 1, wherein said chromium oxide is selected from the group consisting of $Cr_5O_{12}$, $Cr_2O_3$, $Cr_3O_4$, $CrO_2$, $CrO$ and $Cr_3O_2$.

6. The chromium oxide-base ceramic body of claim 1, wherein said chromium carbide is selected from the group consisting of $Cr_3C_2$, $Cr_7C_3$, $Cr_{23}C_6$ and $Cr_2C$.

7. The chromium oxide-base ceramic body of claim 1, wherein said powder has an average particle diameter of smaller than 2 μm.

8. The chromium oxide-base ceramic body of claim 1, wherein said chromium oxide is $Cr_2O_3$ and said chromium carbide is $Cr_3C_2$.

* * * * *